(12) United States Patent
Nishidate

(10) Patent No.: US 6,704,411 B1
(45) Date of Patent: Mar. 9, 2004

(54) SYSTEM AND METHOD FOR REALIZING HOME AGENT CLIENT FUNCTION FOR CALL CENTER SYSTEM

(75) Inventor: Yoshio Nishidate, Tokyo (JP)

(73) Assignee: NEC Corporation, Tokyo (JP)

( * ) Notice: Subject to any disclaimer, the term of this patent is extended or adjusted under 35 U.S.C. 154(b) by 565 days.

(21) Appl. No.: 09/661,462

(22) Filed: Sep. 13, 2000

(30) Foreign Application Priority Data

Sep. 14, 1999 (JP) .......................................... 11-261118

(51) Int. Cl.⁷ ................................................ H04M 3/00
(52) U.S. Cl. ............................. 379/265.09; 379/266.09
(58) Field of Search ........................ 379/265.09, 266.09

(56) References Cited

U.S. PATENT DOCUMENTS

| | | | | |
|---|---|---|---|---|
| 6,018,579 A | * | 1/2000 | Petrunka ................ | 379/221.13 |
| 6,141,340 A | | 10/2000 | Jain | |
| 6,320,956 B1 | * | 11/2001 | Cherry .................. | 379/265.02 |

FOREIGN PATENT DOCUMENTS

| | | |
|---|---|---|
| JP | 7-46321 | 2/1991 |
| JP | 7-283876 | 10/1995 |
| JP | 10-228431 | 8/1998 |
| JP | 11-8715 | 1/1999 |
| JP | 11-41294 | 2/1999 |
| JP | 11-122364 | 4/1999 |

OTHER PUBLICATIONS

Nikkei Communications, May 19, 1997, (pp. 104–109).

* cited by examiner

Primary Examiner—Ahmad F. Matar
Assistant Examiner—Rasha S Al-Aubaidi
(74) Attorney, Agent, or Firm—Foley & Lardner

(57) ABSTRACT

A system for realizing a home agent client function for a call center system has a home agent client 90 for remotely conducting reception processing of a call center 100 by way of an internet 2 through an internet service provider 6 for connecting a public network 1 to the internet 2, and the call center 100 has connection means for connecting a telephone set 5 to the home agent client 90 through a telephone exchange system 10 based on a reception request call to the call center 100 from the telephone set 5, and conversion means for applying two-way data conversion to voice information and control information in association with the voice information to generate an internet protocol packet.

19 Claims, 14 Drawing Sheets

US 6,704,411 B1

SYSTEM AND METHOD FOR REALIZING HOME AGENT CLIENT FUNCTION FOR CALL CENTER SYSTEM

BACKGROUND OF THE INVENTION

The present invention relates to a system for realizing and a method of realizing a home agent client function for a call center system, in which a telephone exchange system having an ACD (Automatic Call Distribution: automatic termination call equivalent distribution) and a computer are connected to each other by means of a LAN and an internet, and more particularly, to a system for realizing and a method of realizing a home agent client function for a call center system, in,which an ISP (Internet Service Provider) is passed by using one of an analog subscription circuit or an ISDN circuit.

As this Kind of conventional technology, for example, in JP-A-46321/1995 "an in-home working system using a telephone" which is a technology using an analog subscription circuit in relation to an in-home working system that has an objective of conducting communication of voice, it is disclosed that tripartite call condition between an operator, a client and a center apparatus is created by an exchange equipment, and business between the operator and the client is conducted under management of the center apparatus.

Also, in JP-A-122364/1999 "a terminal connection system" which relates to a technology using an analog subscription circuit and an ISDN circuit, it is disclosed that, to a termination call, a telephone number of a transfer destination is automatically determined by using a public network, and a transfer to a subscription telephone is conducted.

Also, in JP-A-283876/1995 "a termination call distribution system using an ISDN network which" relates to a technology of a termination call distribution system that has an objective of concurrently handling communication of voice and a data by using an ISDN circuit, it is disclosed that distribution to other pluralities of ISDN terminals joining an ISDN network is conducted, and miscellaneous information can be concurrently sent.

However, in the above-mentioned prior arts, JP-A-46321/1995 and JP-A-122364/1999, there is a problem that communication of voice and a data cannot be concurrently handled, since the prior arts have an arrangement that only a telephone terminal at an in-home telemarketing operator's home is used, and further, there is a problem that it is necessary to report to a center order information that is a result of business by calling the center after completion of the business as an in-home telemarketing operator, and conducting a dial input or data communication using a personal computer or a word processor by the operator's hand.

Also, in JP-A-283876/1995 that has an objective of concurrently handling communication of voice and a data, since an arrangement is adopted, in which a call of termination to the termination call distribution system is transferred every termination, a transfer delay occurs until a call that arrives at the termination call distribution system is connected to an operator, and accordingly, there is a problem that telephone reception lacks quickness, which is mainly caused by the termination call distribution system, and further, since an arrangement is adopted, in which an ISDN circuit is utilized, there is a problem that it cannot be utilized for an analog subscription circuit that is general in a telephone network.

SUMMARY OF THE INVENTION

The objective of the present invention is to solve the above-described tasks.

Also, in the light of the above-described tasks, the objective of the present invention is to concurrently handle communication of voice and a data using an analog subscription circuit or an ISDN circuit, and to realize a home agent client function for a call center system, which has a structure in which quickness of telephone reception that is a main factor of a termination call distribution system is taken into account, and which is capable of providing all functions,necessary for the termination call distribution system, and also, the objective of the present invention is to solve serious tasks of maintenance of resources of a brilliant operator in a call center system that continues to enlarge its scale, and maintenance of an area of a call center.

The objective of the present invention is achieved by a system for realizing a home agent client function for a call center system. The system for realizing the home agent client function for the call center system has a public network, an internet, a call center connected to the public network and internet, and a telephone set of a client of the call center connected to the public network, and the call center has a telephone exchange system having an ACD function, a server for cooperating with the telephone exchange system by means of a computer telephony interface, and a call center agent client having an exclusive telephone function of the telephone exchange system, which operates as a client of the server and conducts telephone reception processing. Also, the system for realizing the home agent client function has a home agent client for remotely conducting reception processing of the call center by way of the internet through an internet service provider for connecting the public network to the internet, and the call center has connection means for connecting the telephone set to the home agent client through the telephone exchange system based on a reception request call to the call center from the telephone set, and conversion means for applying two-way data conversion to voice information and control information in association with the voice information to generate an internet protocol packet, and the home agent client has emulation means for emulating the exclusive telephone function of the telephone exchange system, which operates on a web browser.

Also, in the system for realizing the home agent client function for the call center system, the home agent client handles both voice and a data by having access to the internet by way of the internet service provider using one circuit of the public network.

Moreover, in the system for realizing the home agent client function for the call center system, the home agent client has registration procedure means for applying log-in processing of the call center agent client to the server by way of the internet, and holding means for continuing to hold a call link established until log-out processing of the call center agent client is applied to the server.

Furthermore, in the system for realizing the home agent client function for the call center system, the call center system has delivery and notification means for conducting delivery and notification of miscellaneous information, such as communication items to an operator, information of goods and client related information, as voice information to the home agent client by way of the internet.

Also, in the system for realizing the home agent client function for the call center system, the call center system has accumulation means for accumulating call contents of an operator by means of using the home agent client by way of the internet in a digital audio file form as voice information.

Moreover, in the system for realizing the home agent client function for the call center system, the call center system continues to hold a call link for duration from log-in processing to log-out processing of the home agent client, and accepts the delivery and notification means if preset time passes when the home agent client moves to condition of waiting for reception of a call from the telephone exchange system.

Furthermore, in the system for realizing the home agent client function for the call center system, the call center system continues to hold a call link for duration from log-in processing to log-out processing of the home agent client, and accepts the accumulation means if preset time passes when the home agent client moves to condition of waiting for reception of a call from the telephone exchange system.

Further, in the system for realizing the home agent client function for the call center system, the call center system continues to hold a call link for duration from log-in processing to log-out processing of the home agent client, and accepts the delivery and notification means and the accumulation means if preset time passes when the home agent client moves to condition of waiting for reception of a call from the telephone exchange system.

Also, the objective of the present invention is achieved by a method of realizing a home agent client function for a call center system, in which a public network, an internet, a call center connected to the public network and the internet, and a telephone set of a client of the call center connected to the public network are provided, and the call center has a telephone exchange system having an ACD function, a server for cooperating with the telephone exchange system by means of a computer telephony interface, and a call center agent client for operating as a client of the server and conducting telephone reception processing. In the method of realizing a home agent client function for a call center system, a home agent client is used, which remotely conducts reception processing of the call center by way of the internet through an internet service provider for connecting the public network to the internet, and the home agent client is connected to the server by starting up a;browser and establishes a call link with the telephone exchange system, and after establishment of the call link, establishes condition of waiting for telephone reception processing by means of a screen input and notifies the call center of the condition of waiting for reception, and the in case of receiving a reception request call from the telephone set in the condition of waiting for reception, the call center connects the telephone set to the home agent client that is in the condition of waiting for reception, and makes the home agent client execute telephone reception processing from the telephone set, and in case that connection to the telephone set is not conducted under the condition of waiting for reception, the call center transmits voice information stored in the call center with an internet protocol packet.

Also, in the method of realizing the home agent client function for the call center system, the home agent client has emulation means for emulating an exclusive telephone function of the telephone exchange system, which operates on a web browser.

Moreover, in the method of realizing a home agent client function for the call center system, the home agent client handles both voice and a data by having access to the internet by way of the internet service provider using one circuit of the public network.

Furthermore, in the method of realizing the home agent client function for the call center system, the call center system has delivery and notification means for conducting delivery and notification of miscellaneous information, such as communication items to an operator, information of goods and client related information, as voice information to the home agent client by way of the internet.

Also, in the method of realizing the home agent client function for the call center system, the call center system has accumulation means for accumulating call contents of an operator by means of using the home agent client by way of the internet in a digital audio file form as voice information.

Moreover, in the method of realizing the home agent client function for the call center system, the call center system continues to hold a call link for duration from log-in processing to log-out processing of the home agent client, and accepts the delivery and notification means and the accumulation means if preset time passes when the home agent client moves to condition of waiting for reception of a call from the telephone exchange system.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
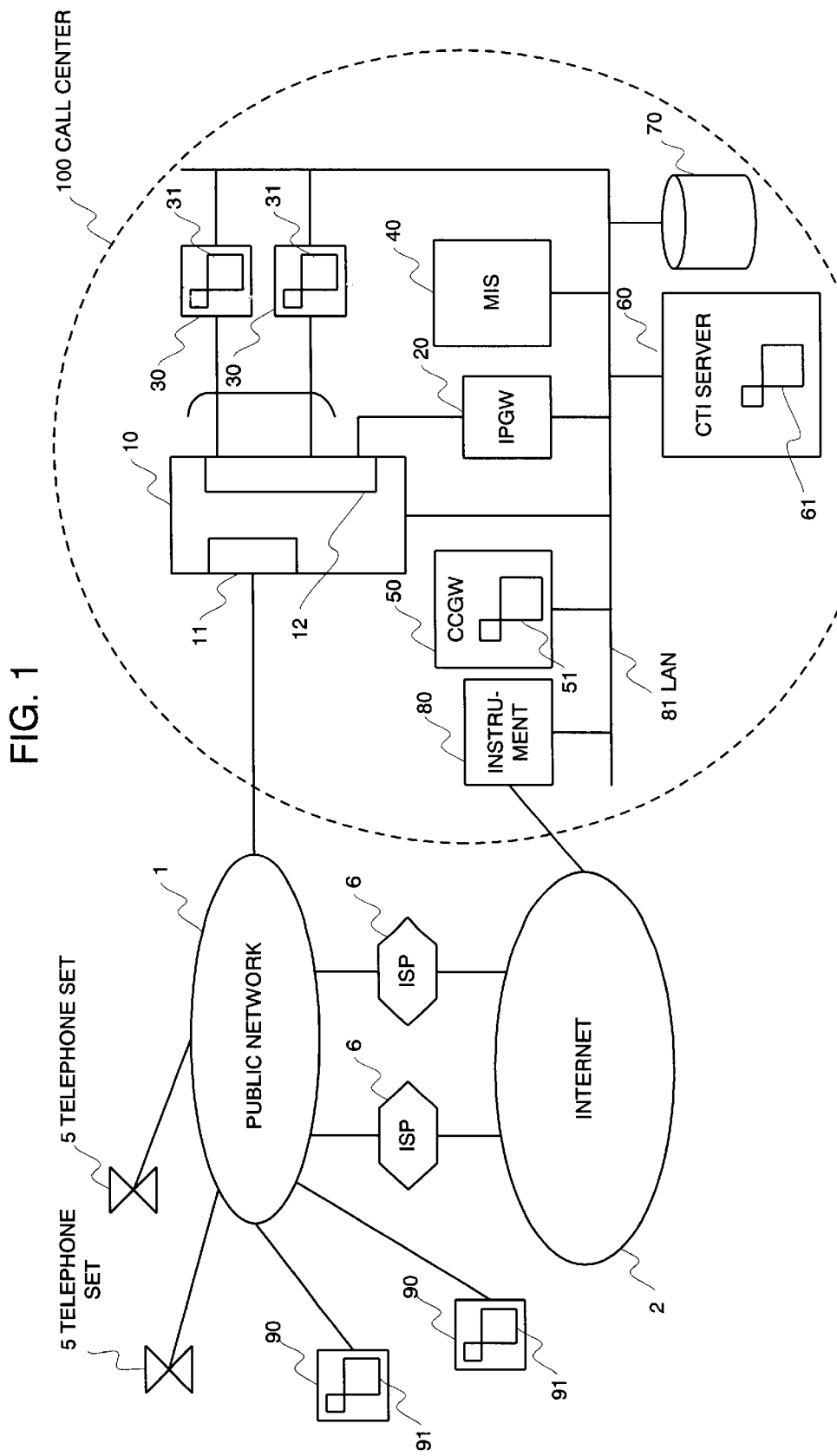
FIG. 1 is a block diagram of a whole network showing an embodiment of the present invention.

Referring to the drawings, embodiments of the present invention will be explained.

FIG. 1 is a block diagram of a whole network showing an embodiment of the present invention. Referring to FIG. 1, a system in the embodiment of the present invention is constructed of a call center 100, a public network 1 of an analog subscription circuit or an ISDN circuit, an internet 2, an internet service provider (referred to as an ISP, hereinafter) 6 for connecting the public network 1 to the internet 2, home agent clients 90 for remotely conducting reception processing of the call center 100 by means of a computer (that operates by means of program control using a processor) having a function that it has access to the internet 2, and telephone sets 5 of clients of the call center.

Each of the home agent clients 90 is constructed of multifunction telephone software (referred to as an AWP, hereinafter) 91 for emulating an ACD system exclusive telephone function that operates on a web browser, and a computer having instruments for internet connection, such as a modem (not shown) for making the AWP 91 operate.

The call center 100 is constructed of a LAN 81 that is a local area network (including connecting instruments), an ACD system 10 that is a telephone exchange system having an ACD function, which has a network interface circuit (referred to as an NIC, hereinafter), an ACD system management apparatus (referred to as an MIS) 40 for conducting execution and management of a current display function, a statistic function and an arrangement change function of the ACD system, which is formed of a computer having an NIC, a computer telephony interface server (referred to as a CTI server, hereinafter) 60 for cooperating with the ACD system 10 by means of a computer telephony interface (referred to as a CTI, hereinafter), call center agent clients 30 for operating as clients of the CTI server 60 and conducting telephone reception processing of an operator, an IPGW 20 that is an apparatus connected to the ACD system, for applying two-way conversion to voice information and control information in association with the voice information in real time to generate an internet protocol packet (referred to as an IP packet), an instrument 80 for internet connection, such as a fire wall and a router, a CCGW 50 that is an apparatus for logically connecting both the internet 2 and the LAN 81 to each other, and a client database 70 that is formed of a main frame and a file server.

The call center 100 is constructed of a LAN 81 that is a local area network (including connecting instruments), an ACD system 10 that is a telephone exchange system having an ACD function, which has a network interface circuit (referred to as an NIC, hereinafter), an ACD system management apparatus (referred to as an MIS) 40 for conducting execution and management of a current display function, a statistic function and an arrangement change function of the ACD system, which is formed of a computer having an NIC, a computer telephony interface server (referred to as a CTI server, hereinafter) 60 for cooperating with the ACD system 10 by means of a computer telephony interface (referred to as a CTI, hereinafter), call center agent clients 30 for operating as clients of the CTI server 60 and conducting telephone reception processing of an operator, an IPGW 20 that is an apparatus connected to the ACD system, for applying two-way conversion to voice information and control information in association with the voice information in real time to generate an internet protocol packet (referred to as an IP packet), an instrument 80 for internet connection, such as a fire wall and a router, a CCGW 50 that is an apparatus for logically connecting both the internet 2 and the LAN 81 to each other, and a client database 70 that is formed of a main frame and a file server.

Figure 4:
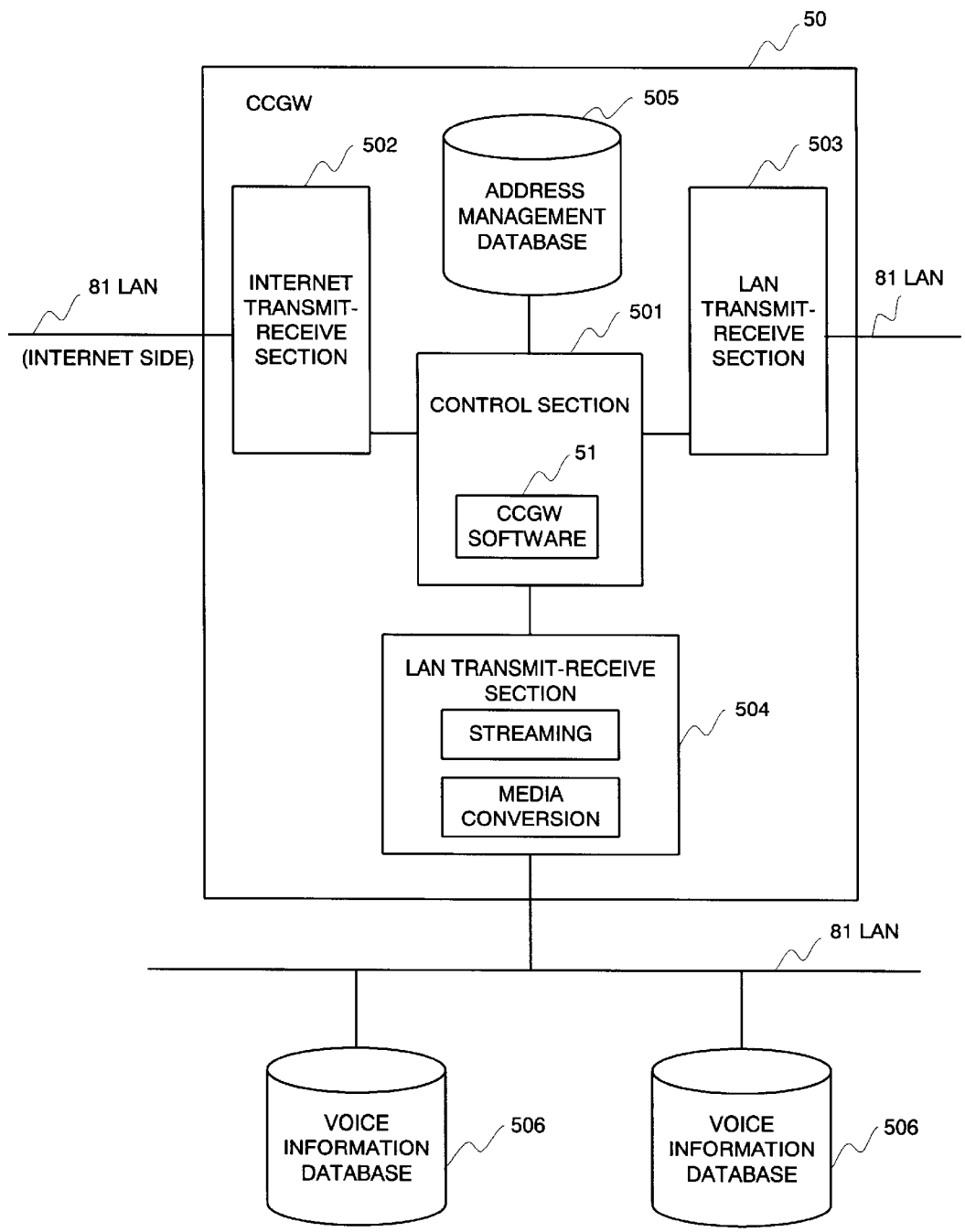
FIG. 4 is a block diagram showing an arrangement of an inside of a CCGW in FIG. 1.

FIG. 4 is a block diagram showing an arrangement of an inside of the CCGW 50 in FIG. 1. Referring to FIG. 4, the CCGW 50 is constructed of a control section 501 for making a computer operate in accordance with program control by means of CCGW software 51, an internet transmit-receive section 502 connected to the LAN 81, for conducting IP packet communication processing with the internet via the instrument 80, a LAN transmit-receive section 503 for conducting IP packet communication processing between the ACD system 10, the CTI server 60 and the MIS 40 that are connected to the LAN 81, a voice information database 506 connected to the LAN 81, a LAN transmit-receive section 504 for conducting IP packet communication processing with the voice information database 506 that is connected to the LAN 81, and an address management database 505.

The control section 501 of the CCGW 50 is constructed of means for conducting management and conversion of an unfixed IP address used for dial-up connection and an IP address used in the call center 100, and controlling web-browsing between a web browser of the home agent clients 90 and the CTI server 60, means for controlling voice traffic between the AWP 91 and the ACD system 10, and means for conducting conversion of data communication between the web browser of the home agent clients 90 and the MIS 40, although these means are not shown in the drawings.

The CTI server 60 is constructed of CTI middle ware 61 for structuring a CTI system of a server/client method, and a computer having an NIC (not shown) for making the CTI middle ware 61 operate.

Each of the call center agent clients 30 is constructed of multifunction telephone software 31 for emulating an ACD system exclusive telephone function that operates on a web browser, and a computer having an NIC (not shown) for making the multifunction telephone software 31 operate.

In addition, the control section 501 of the CCGW 50 includes means for distributing miscellaneous information, such as communication items to a call center operator, information of goods and client related information, as voice information to the home agent clients 90 by way of the internet 2, which are used by an in-home operator or an operator in a remote office, means for accumulating call contents of an in-home operator or a call center operator in a remote office in an apparatus connected to the LAN 81 in a digital audio file form such as a WAV as the voice information database (referred to as a voice information DB) 506, and means for notifying the home agent clients 90 that are used by an in-home operator or an operator in a remote office of miscellaneous information, such as communication items to a call center operator, information of goods and client related information, as voice information by way of the internet 2. Further, each of the home agent clients 90 includes means for receiving information that is distributed by way of the internet 2, such as miscellaneous voice information provided by the CCGW 50 and call record contents accumulated in a digital audio file form like a WAV, if preset time passes when condition moves to ready mode condition by means of intention of an in-home operator or an operator in a remote office.

The CCGW 50 is connected to both the internet 2 and the LAN 81, and conducts management and conversion of an IP address used in the LAN 81 of the call center 100 and an unfixed IP address allocated every time the home agent clients 90 have access to the internet 2 by way of the ISP 6. The CCGW 50 conducts such control in the control section 501.

Particularly, the control section 501 of the CCGW 50 accumulates preset IP addresses allocated to the home agent clients 90 and an IP address used when web-browsing is requested from the home agent clients 90 in the address management database (referred to as an ADB, hereinafter) 505 of the CCGW 50.

Figure 2:
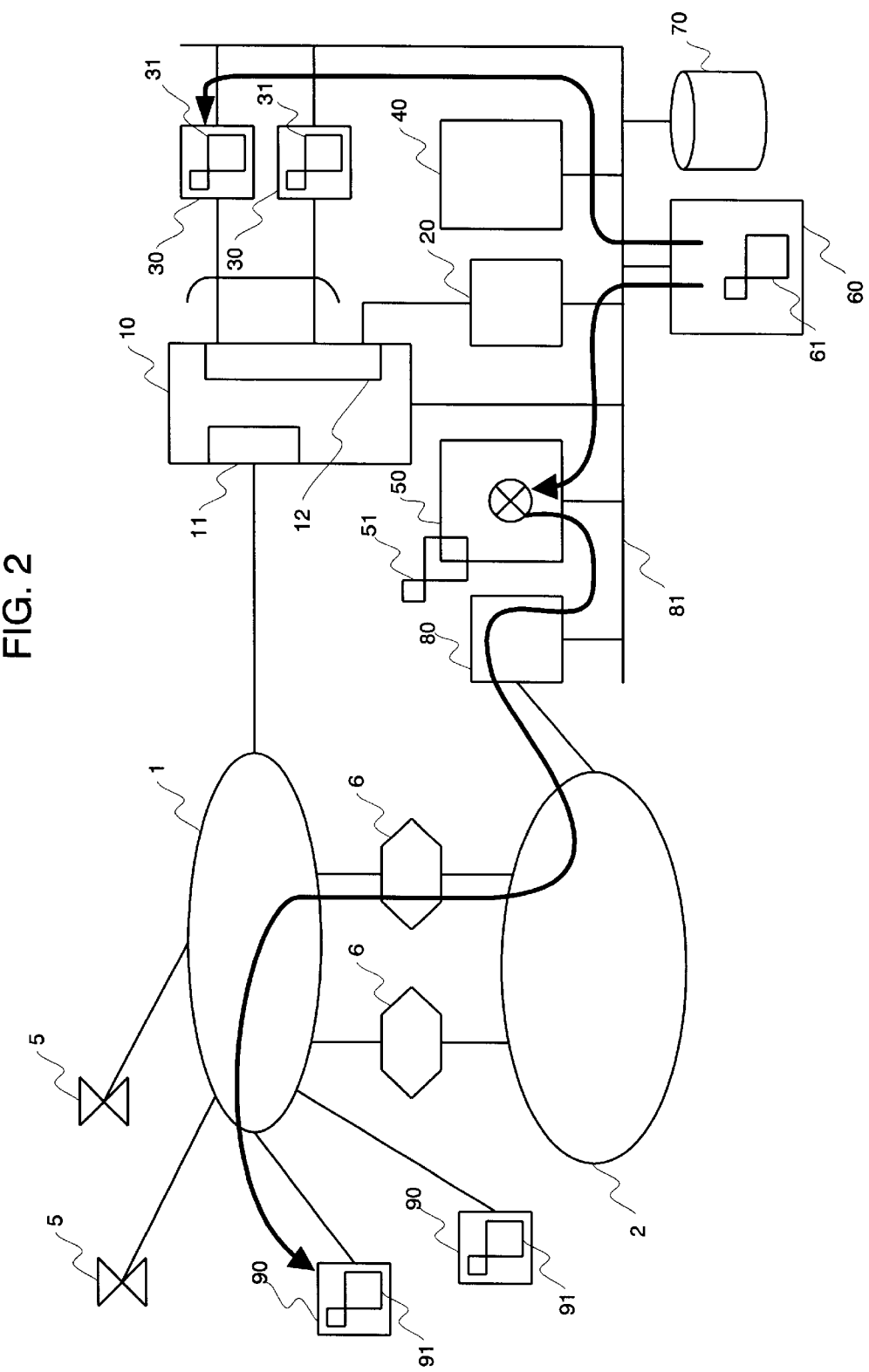
FIG. 2 is a network view showing data communication processing of call center agent clients and home agent clients.
Figure 5:
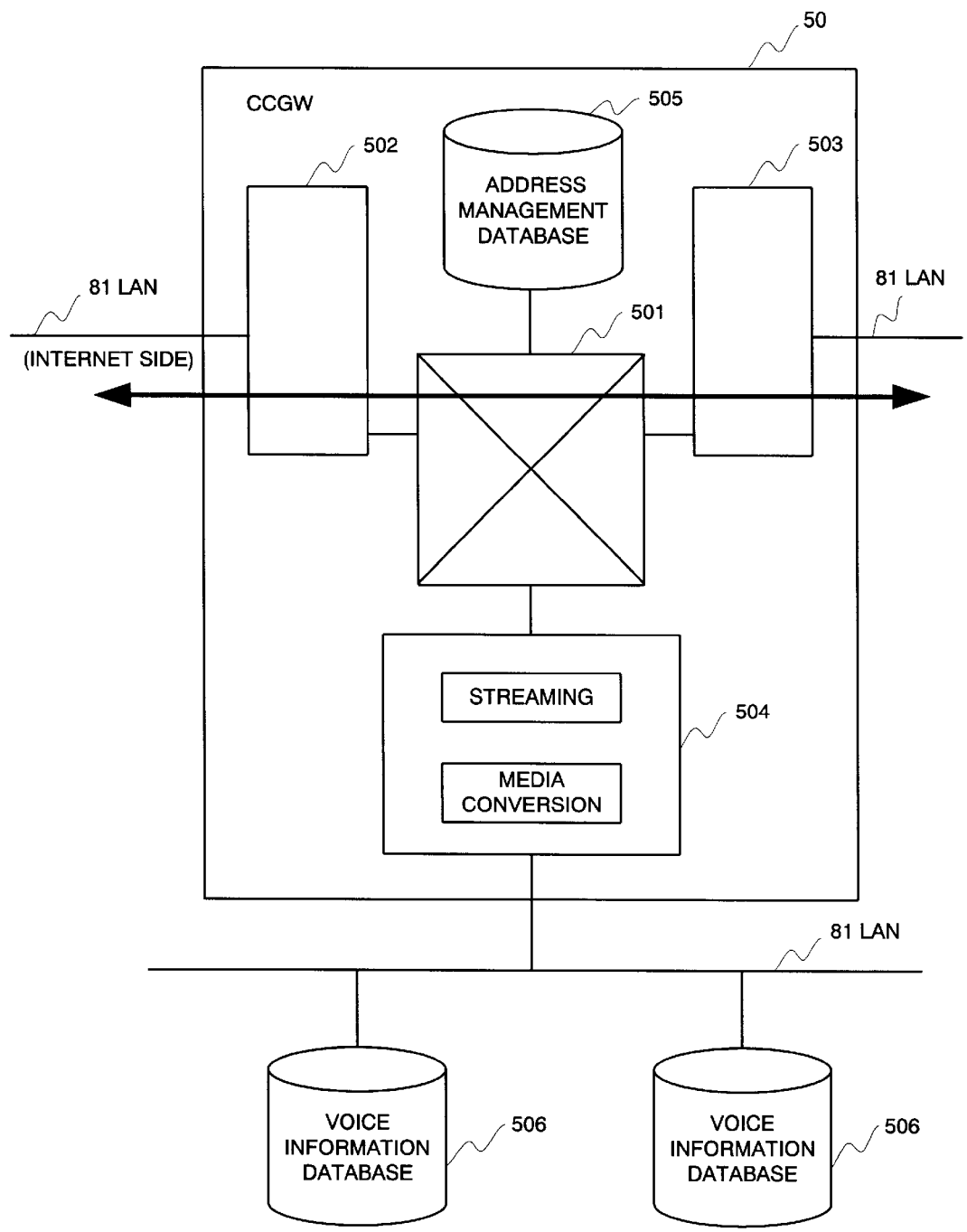
FIG. 5 is a conceptual view showing the operation (data/voice communication) of the CCGW in FIG. 1.

FIG. 2 is a network view showing data communication processing of the call center agent clients and the home agent clients, and FIG. 5 is a conceptual view showing the operation (data/voice communication) of the CCGW in FIG. 1. As shown in FIG. 2 and FIG. 5, with regard to data communication, based on a web-browsing request from the agent clients 90, the IP addresses in the ADB 505 of the CCGW 50 are retrieved, and the IP address of the home agent clients 90 is converted and transferred to the CTI server 60.

In the same manner, based on information received from the CTI server 60, the IP addresses in the ADB 505 of the CCGW 50 are retrieved, and the IP address of the home agent clients 90 is converted and transferred to the home agent clients 90.

Figure 3:
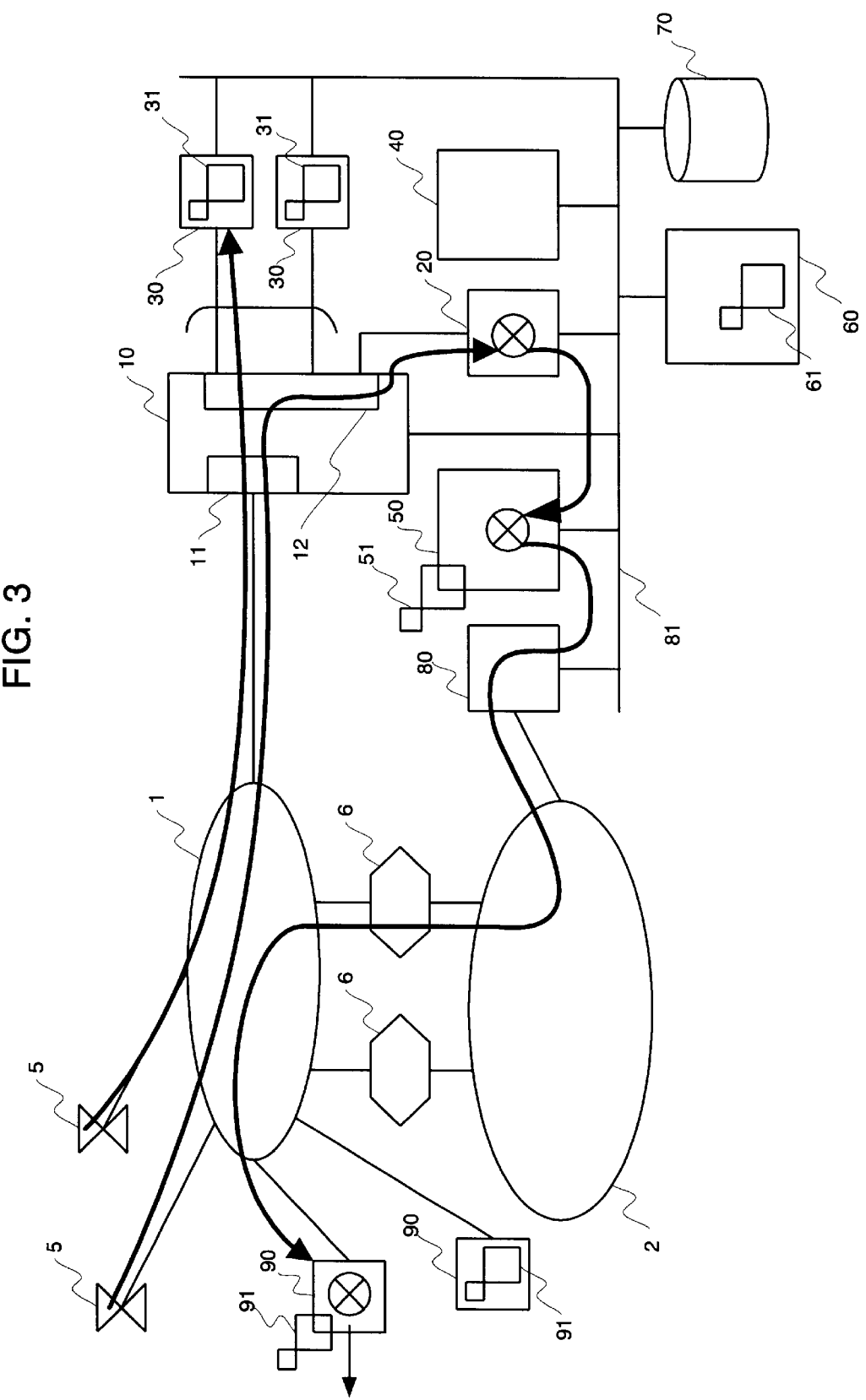
FIG. 3 is a network view showing voice communication processing of the call center agent clients and the home agent clients.

FIG. 3 is a network view showing voice communication processing of the call center agent clients and the home agent clients.

As shown in FIG. 3 and FIG. 5, with regard to voice communication, like the data communication, by applying IP address conversion to voice information and control information of the ACD system 10, which are transmitted to the LAN 81 by way of the IPGW 20, and voice information and control information from the home agent clients 90, voice communication between the ACD system 10 and the home agent clients 90 is realized.

Figure 6:
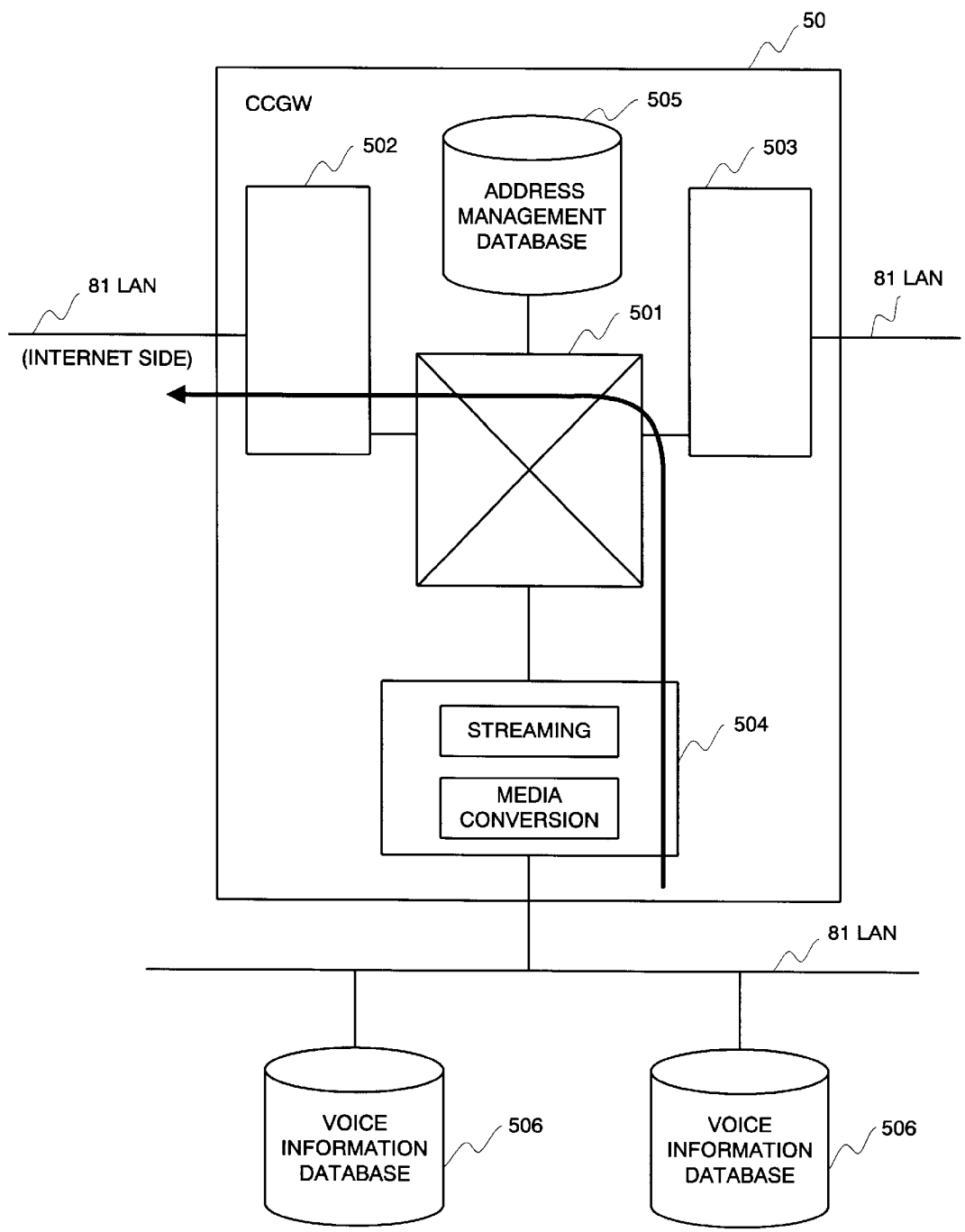
FIG. 6 is a conceptual view showing the operation (distribution of miscellaneous information, such as communication items to an operator, information of goods and client related information, as voice information to an in-home operator or an operator in a remote office) of the CCGW in FIG. 1.

FIG. 6 is a conceptual view showing the operation of the CCGW in FIG. 1.

Also, as shown in FIG. 6, the CCGW 50 realizes distribution of miscellaneous voice information, such as communication items to a call center operator, information of goods and client related information, and record contents accumulated in the voice information DB 506 in a digital audio form such as a WAV to an in-home operator or an operator in a remote office by way of the internet 2 in real time by using a known internet streaming technology.

Figure 7:
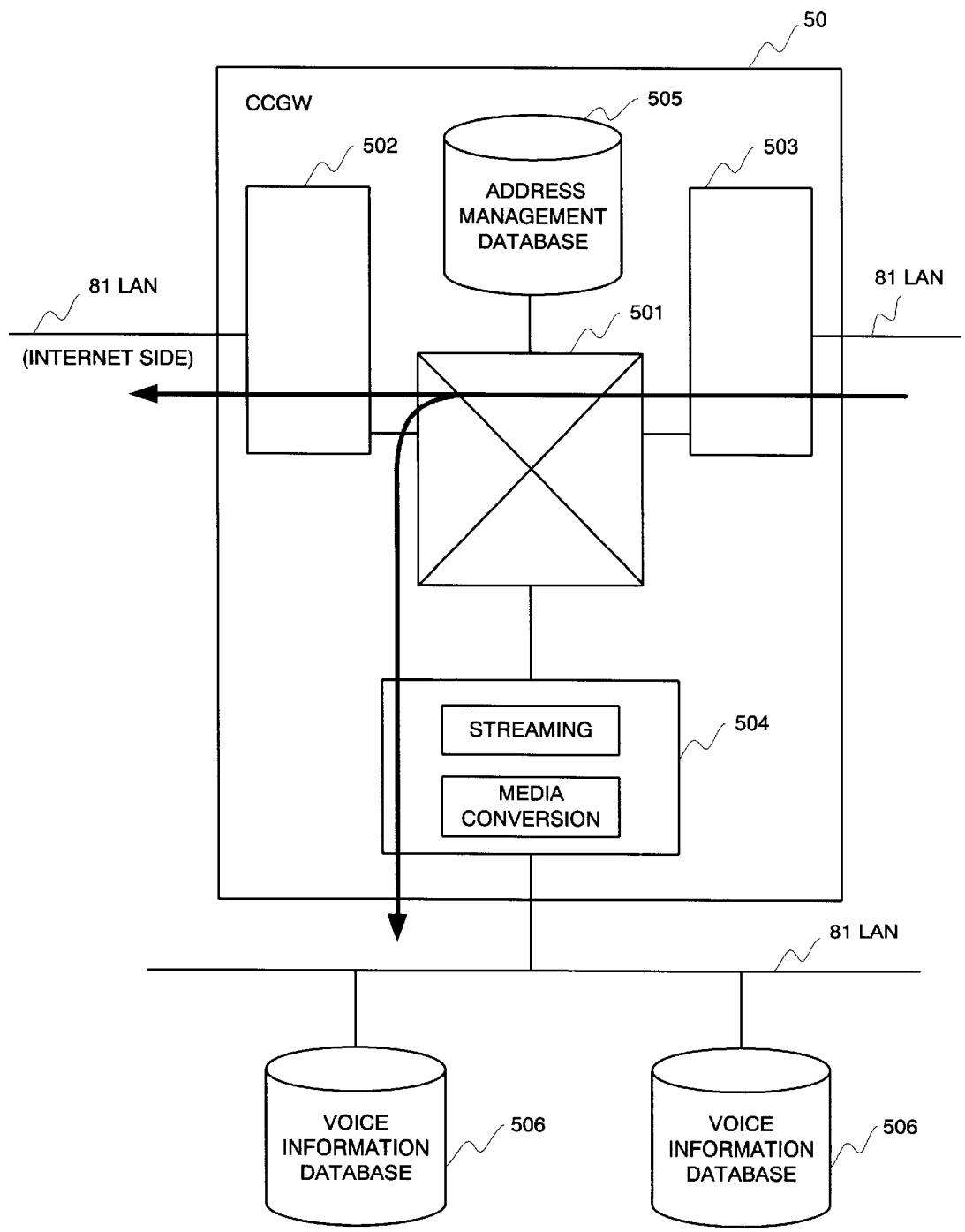
FIG. 7 is a conceptual view showing the operation (accumulation of call contents of an operator as a voice information database in a digital audio file form such as a WAV) of the CCGW in FIG. 1.

FIG. 7 is a conceptual view showing the operation of the CCGW in FIG. 1.

Further, as shown in FIG. 7, the CCGW 50 applies media conversion to voice packets that are relayed between the internet 2 and the LAN 81, namely call contents of an in-home operator or an operator of a remote office to create a digital audio file form such as a WAV, and accumulates them in an apparatus connected to the LAN 81 as the voice information DB 506.

Next, the whole operation of this embodiment will be explained in detail.

First, the general operation of the call center agent clients 30 installed on a floor of the call center 100 is as follows:

When a web browser is started up, and information of an operator ID code and an ACD attendant's switchboard extension number are input to the CTI server 60, the call center agent clients 30 make a request of log-in processing to the CTI server 60. Then, the CTI server 60 executes log-in processing therein and makes a request of a log-on processing to the ACD system 10 by using the above-described information.

The ACD system 10 that received the request conducts log-on processing therein, and notifies the CTI server 60 that the processing was normally completed.

The CTI server 60 that receives this notification transmits web screen information (referred to as a form data, hereinafter) of a call center agent screen, which notifies that log-in to the CTI server 60 was conducted, to the call center agent clients 30.

In addition, at this time, the ACD system 10 notifies the multifunction telephone software 31 for emulating the ACD system exclusive telephone function which operates on the web browser that log-on to the ACD system 10 was conducted, and notifies the multifunction telephone software 31 of condition setting of a telephone set.

Next, when a call from the telephone sets 5 of clients of the call center arrives at the ACD system 10 by way of the public network 1 and a trunk circuit 11, and is equivalently distributed and connected to a call center operator most suitable for the reception of the call (reception request call), and to the call center agent client 30 by way of a digital line circuit 12, the ACD system 10 transmits termination notification to the CTI server 60, to which information relating to a termination such as an addresser discrimination number and an addresser dial number, is added.

The CTI server 60 conducts retrieval of the client database 70 while making the information relating to the termination call, such as an addresser discrimination number and an addresser dial number, to be a key, and notifies the call center agent clients 30 of a retrieval result as a form data.

Figure 9:
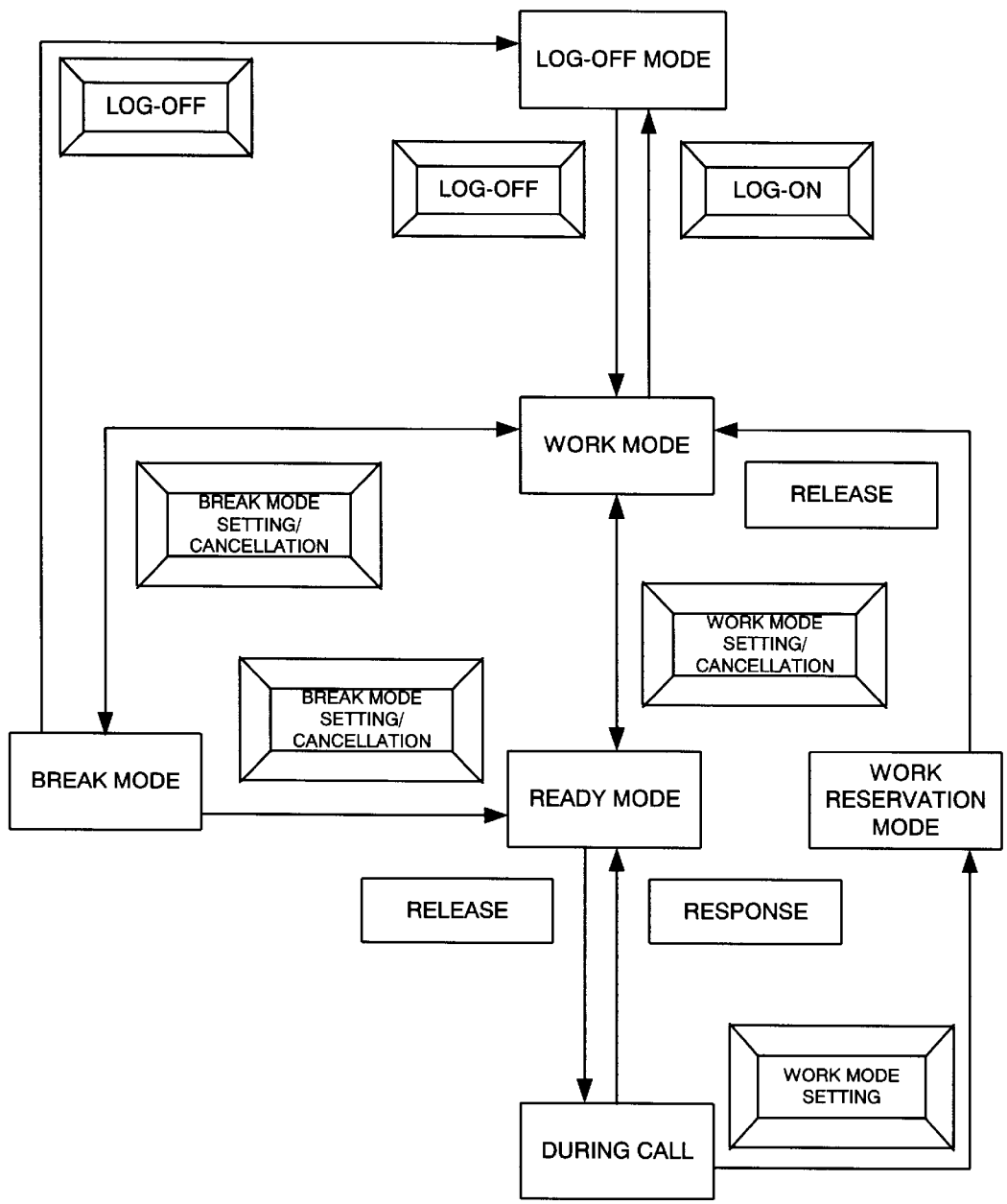
FIG. 9 is a condition transition view of multifunction telephone software for emulating an ACD system exclusive telephone function by which the call center agent clients and the home agent clients operate on a web browser.

Further, FIG. 9 is a condition transition view of the multifunction telephone software for emulating the ACD system exclusive telephone function by which the call center agent clients and the home agent clients operate on the web browser, and by means of the operation of the call center agent screen, by way of the multifunction telephone software 31 for emulating the ACD system exclusive telephone function which operates on the web browser, the ACD system 10 conducts condition transition of the call center agent clients 30 as shown in FIG. 9, and the CTI server 60 transmits a form data corresponding to the operation of the call center agent screen to the call center agent clients 30.

In addition, log-out processing of the call center agent clients 30 is executed in accordance with the same procedure of the log-in processing.

In other words, condition transition shown in FIG. 9 is into five conditions of a log-off mode, a work mode, a ready mode, a work reservation mode, and "during call". The log-off mode indicates condition in which log-in to the CTI server is not conducted, the work mode indicates condition in which the reception of a call is temporarily suspended under condition of log-in to the CTI server 60, and local processing is desirable, the ready mode indicates condition in which a call is received, and the "during call" indicates condition in which a call is received in the ready mode, and communication is conducted, and a break mode indicates condition in which every processing is suspended under condition of log-in to the CTI server 60 (, which is set in case that an operator leaves his or her seat for a rest, for example), and the work reservation mode indicates condition in which the reception of a call is temporarily suspended during call by setting the work mode during call. As shown in FIG. 9, transition from one condition to other condition is conducted by clicking (pushing) a button displayed on a screen or conducting communication of call. In an example of FIG. 9, there are buttons of log-off, log-on, break mode setting/cancellation and work mode setting/cancellation.

Figure 8:
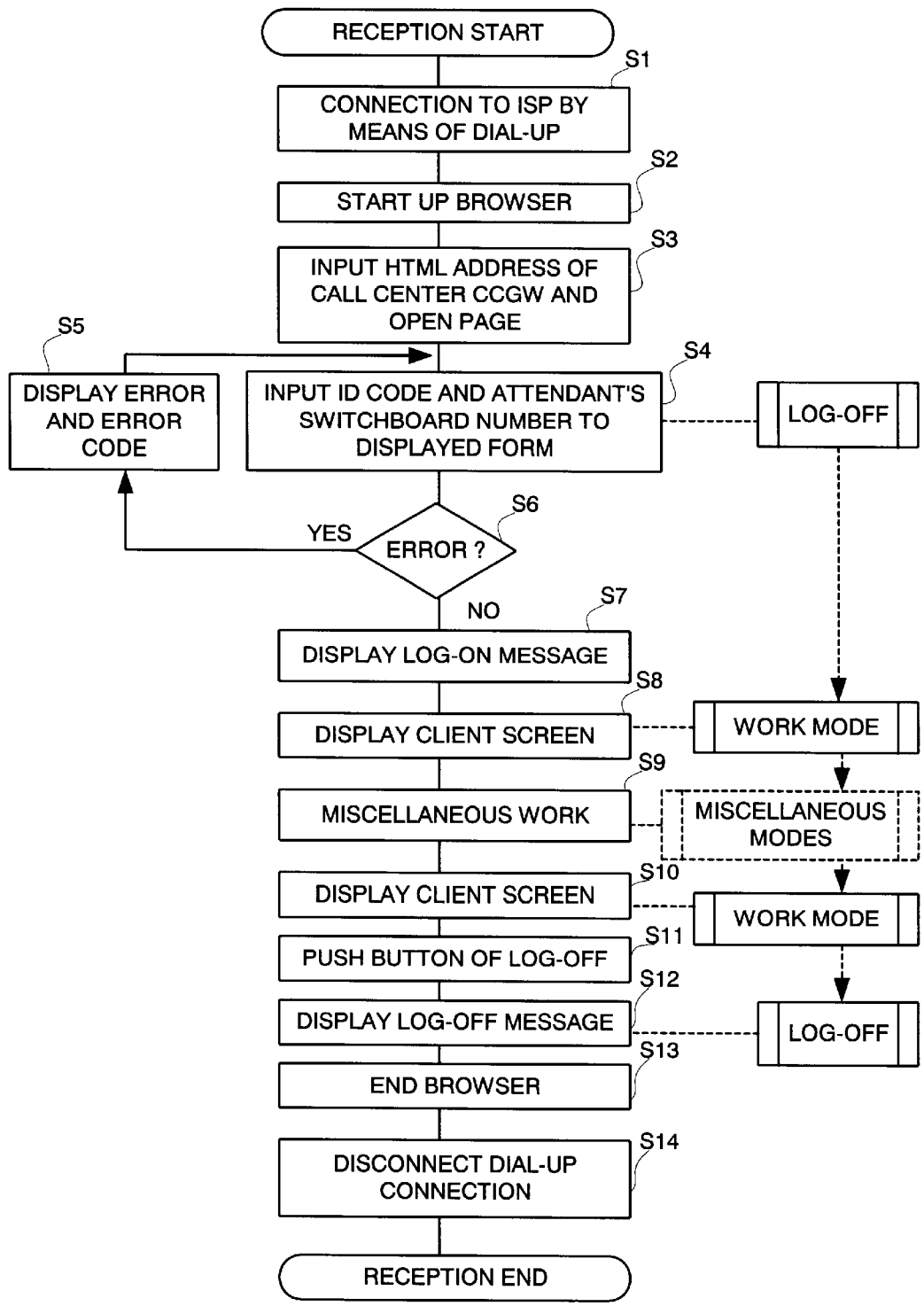
FIG. 8 is a flowchart showing log-in/log-of processing of the home agent clients.
Figure 10:
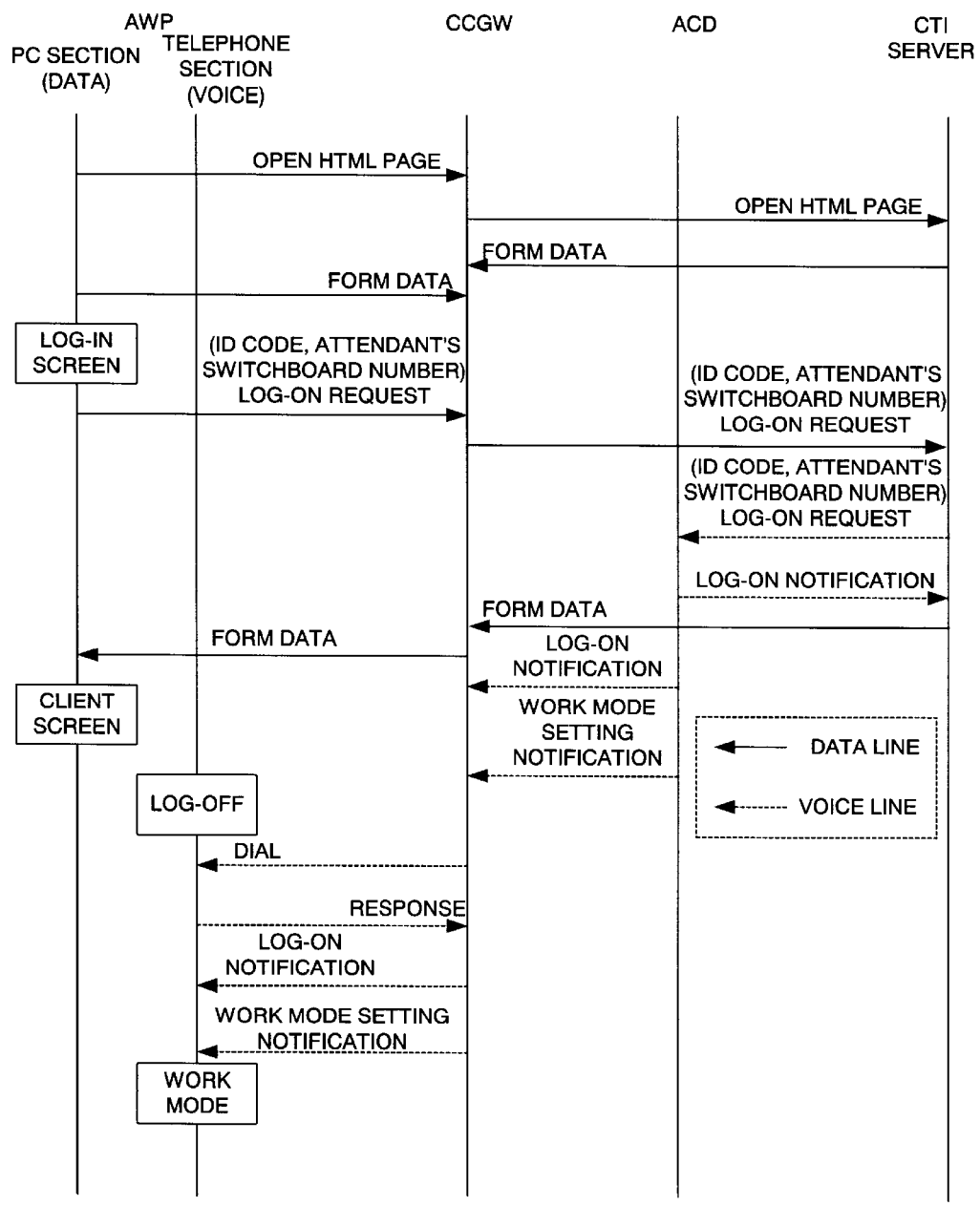
FIG. 10 is a sequence,chart showing log-on processing of the home agent clients in FIG. 1.
Figure 11:
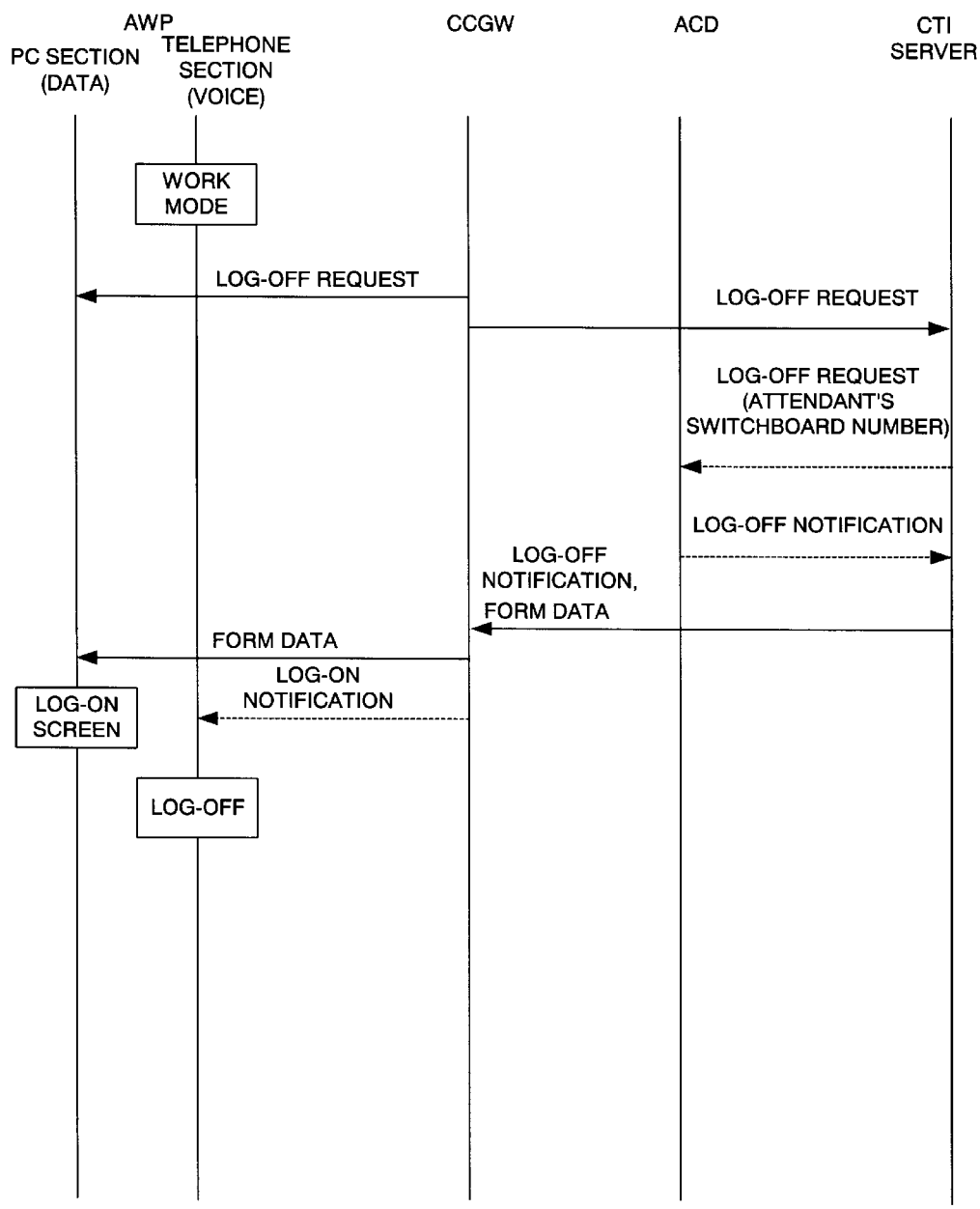
FIG. 11 is a sequence chart showing log-off processing of the home agent clients in FIG. 1.
Figure 12:
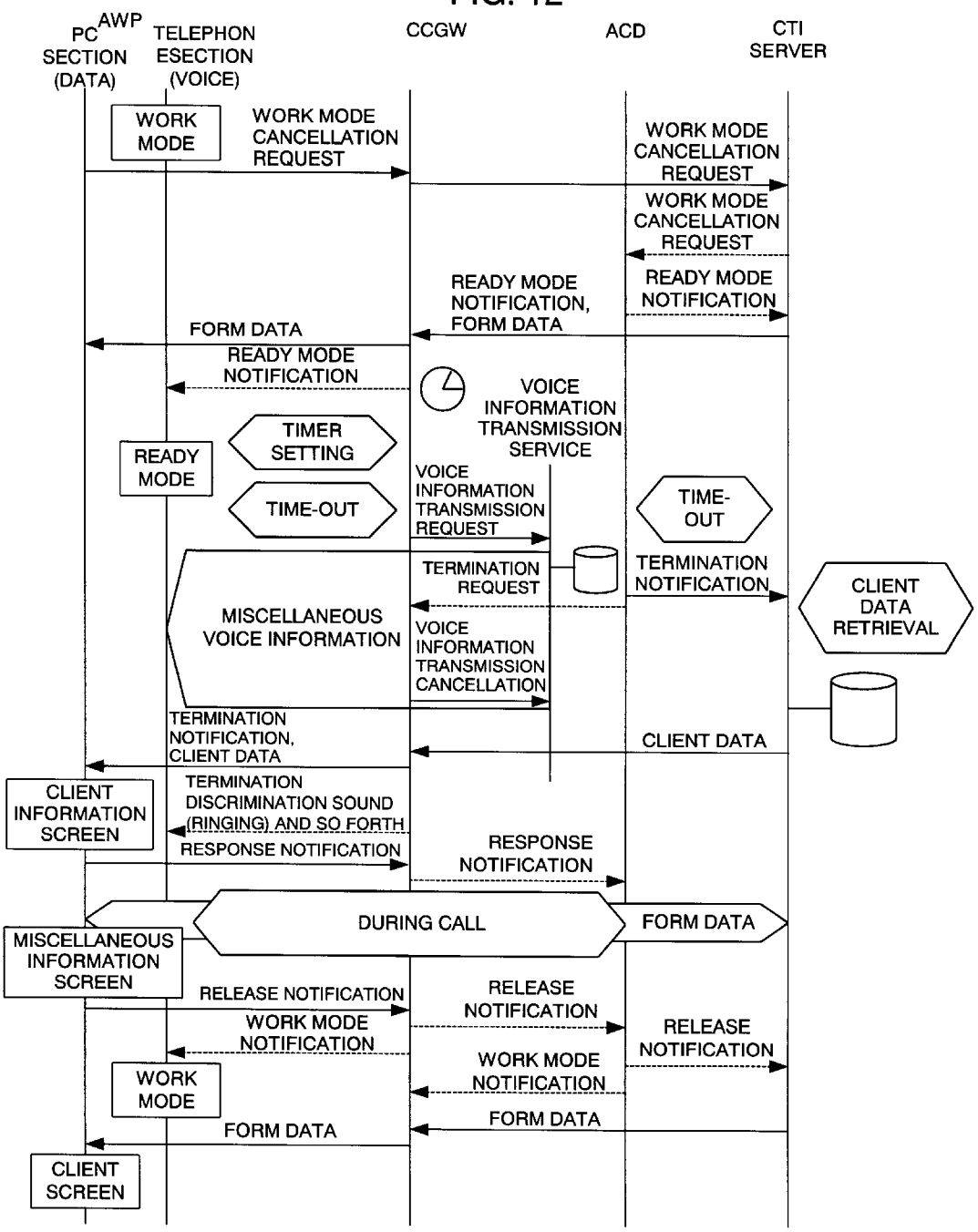
FIG. 12 is a sequence chart showing condition transition (a work mode, a ready mode, call, release and a work mode) of the home agent clients and voice information distribution processing of the CCGW in FIG. 1.

FIG. 8 is a flowchart showing log-in/log-of processing of the home agent clients, FIG. 10 is a sequence chart showing log-on processing of the home agent clients in FIG. 1, FIG. 11 is a sequence chart showing log-off processing of the home agent clients in FIG. 1, and FIG. 12 is a sequence chart showing condition transition (a work mode, a ready mode, call, release and a work mode) of the home agent clients and voice information distribution processing of the CCGW in FIG. 1.

On the other hand, with regard to the operation of the home agent clients 90, as shown in a flowchart of FIG. 8 and sequence charts of FIG. 10 to FIG. 12, the home agent clients 90 operate in accordance with the same processing in the operation of the call center agent clients 30 through the agency of the CCGW 50.

First, the home agent clients 90 are connected to the ISP's 6, and start up a browser (step S1 and S2 in FIG. 8).

When an address by means of HTML (Hyper Text Markup Language) of the CCGW 50 of the call center 100 is input after the start up of the browser, the home agent clients 90 open a home page of the CTI server 60 by way of the CCGW 50, and read out a corresponding form data by means of a screen operation (step S3)

Then, the CTI server 60 sends the home agent clients 90 the form data corresponding to the screen operation. Thereafter, the home agent clients 90 display the form data on the screen, and when an ID code and an attendant's switchboard number to the displayed form data are input, the home agent clients 90 make a request of log-in processing to the CTI server 60. The CTI server executes log-in processing therein, and makes a request of log-on processing to the ACD system 10 based on the received ID code and attendant's switchboard number. The ACD system 10 that received the request by way of the IPGW 20 conducts log-on processing therein, and notifies the CTI server 60 that the processing was normally completed. The CTI server 60 that received this notification transmits a form data of a call center agent screen, which notifies the home agent clients 90 that log-in to the CTI server 60 was conducted. At this time, if there is discrepancy between the received ID code and attendant's switchboard number and registered ID code and attendant's switchboard number, the CTI server 60 notifies the home agent clients 90 of an error and an error code. The home agent clients 90 display the received error and error code, and demand an input of an ID code and an attendant's switchboard number again (steps S4, S5 and S6).

If there is no error at this time, the home agent clients 90 display a client image by displaying the received form data (log-on message) on the screen (steps S7 and S8). Condition of the home agent clients 90 at this time is that of a work mode.

The condition of the home agent clients 90 is changed in accordance with the condition transition view in FIG. 9 by means of the screen operation or communication by an operator, and make the operator do various kinds of work in accordance to the change of the condition (step S9).

Before long, when the button of log-off is pushed after the condition is in a work mode, and the home agent clients 90 notify the CTI server 60 of the log-off, the CTI server 60 conducts log-off processing therein, and makes a request of log-off of the requested attendant's switchboard number to the ACD system 10. The ACD system 10 that received the request conducts log-off processing therein, and notifies the CTI server 60 that the processing was normally completed. The CTI server 60 that received this notification transmits a log-off message which notifies the home agent clients 90 that the log-off was conducted. When receiving this message, the home agent clients 90 display the log-off message on the screen, end the browser, and end dial-up connection (steps S10 to S14).

Also, as shown in the sequence view of FIG. 12, with regard to the distribution of voice information to the home agent clients 90, when the condition of the home agent clients 90 is moved and becomes to be a ready mode, a timer within the CCGW 50 operates, and at a time point of time-out, a voice information transmission request is executed in a voice information transmission process of the CCGW 50.

If there is no error at this time, the home agent clients 90 displays a client image by displaying the received form data (log-on message) on the screen (steps S7 and S8). Condition of the home agent clients 90 at this time is that of a work mode.

In other words, referring to FIG. 12, when the home agent clients 90 is in a work mode, and the work mode cancellation button is pushed, the home agent clients 90 notifies the CTI server 60 of a work mode cancellation request by way of the CCGW 50. When receiving this notification, the CTI server 60 makes a request of a work mode cancellation to the ACD system 10. Then, when receiving this cancellation request, the ACD system 10 sets a ready mode from the work mode for the corresponding attendant's switchboard number, and sends the CTI server 60 a ready mode notification by return. At this time, a mode table is stored in a storage section inside the ACD system 10 so that it can be understood which mode is set for each of the plurality of the home agent clients 90. When receiving this ready mode notification, the CTI server 60 transmits the ready mode notification together with a form data to the home agent clients 90 by way of the CCGW 50. Then, the home agent clients 90 display a screen of the ready mode, and transitions to the ready mode. At this time, since the home agent clients 90 is in the ready mode, in the CCGW 50, the time of the CCGW 50 operates, and at a time point of time-out, a voice information transmission request to the home agent clients 90 is executed in a voice information transmission process of the CCGW 50. Accordingly, various kinds of voice information can be collected in accordance with a menu screen from the home agent clients 90 through the CCGW 50. In other words, the control section 501 of the CCGW 50 provides various kinds of the voice information by reading out a voice data from the voice information DB 506 via the LAN transmit-receive section 504 while making the information corresponding to instruction of the menu screen from the home agent clients 90, and further, converting the read voice data into a voice packet and sending it to the home agent clients 90 via the internet transmit-receive section 502. The CCGW 50 is constructed so that, in case that a call is distributed and connected by means of the ACD system 10 before the time-out, the timer is cancelled, and the voice information request is not executed. Before long, when the home agent clients 90 moves to a ready mode from a "during call", the timer of the CCGW 50 starts up again, and service of various kinds of voice information is provided again to the home agent clients 90 when the timer times-out.

In other words, in relation to characteristic of the telephone reception of the call center, at most busy time, a call continuously arrives from the telephone sets 5 of clients of the call center 100. Accordingly, it is considered that, after some interval from a time point when the "during call"

condition moves to the ready condition, in case that a telephone connection request from the call center 100 does not exist, it becomes to be a slack condition. By providing various kinds of voice information service by means of timer processing in the CCGW 50 of the call center 100, an operator (namely, an in-home operator or an operator in a remote office) who does not work during a period of this slack time can effectively make use of his or her spare moments, which can contribute to relaxation in spare moments from his or her work, relief from tension to waiting on clients, effective utilization of communication notification from an operating center to the operator, and so forth.

On the other hand, when a call arrives from the telephone set 5 of a client of the call center, the ACD system 10, which makes a mode of the corresponding home agent clients 90 within the mode table to be a ready mode by means of a work mode cancellation request, retrieves the mode table in order to apply the agency of an operator to the home agent clients 90, and determines the home agent clients 90 to which the agency of an operator is applied, and notifies the CTI server 60 of this termination of the call by way of the IPGW 20. When receiving the setting of the call, the CTI server 60 retrieves the client database 70 connected to the CTI server 60, and adds a record data that was read out, and conducts termination notification to the home agent clients 90 by way of the CCGW 50. Then, the home agent clients 90 displays client information on a screen, and transitions to the "during call" state by sending a response notification to the telephone set 5 by return by way of the ACD system 10. At this time, the CCGW 50 begins communication by making the home agent clients 90 operable for termination discrimination sound or termination discrimination display and response thereto. Also, communication of voice between the telephone set 5 and the home agent clients 90 is executed via the IPGW 20. With regard to voice information that was converted into a packet, via the AWP's 91 of the home agent clients 90, voice is converted into a packet data or a packet data is converted into voice, respectively. Before long, when communication between an operator and a client is completed, the operator operates a release button in a telephone part of the home agent clients 90, and the home agent clients 90 send release notification to the ACD system 10 by way of the CCGW 50. Then, the ACD system 10 ends the call with the telephone set 5, and sets a mode of the corresponding home agent clients 90 within the mode table to a work mode, and notifies the CTI server 60 of the release notification, and conducts work mode notification to the home agent clients 90 by way of the CCGW 50. In parallel with this, when receiving the release notification, the CTI server 60 transmits a form data to the home agent clients 90. When receiving the form data, the home agent clients 90 display a client screen for showing a work mode.

In addition, in case that a call is distributed and connected to the home agent clients 90 before time-out, the timer is cancelled, and a voice information transmission request is not executed.

Figure 13:
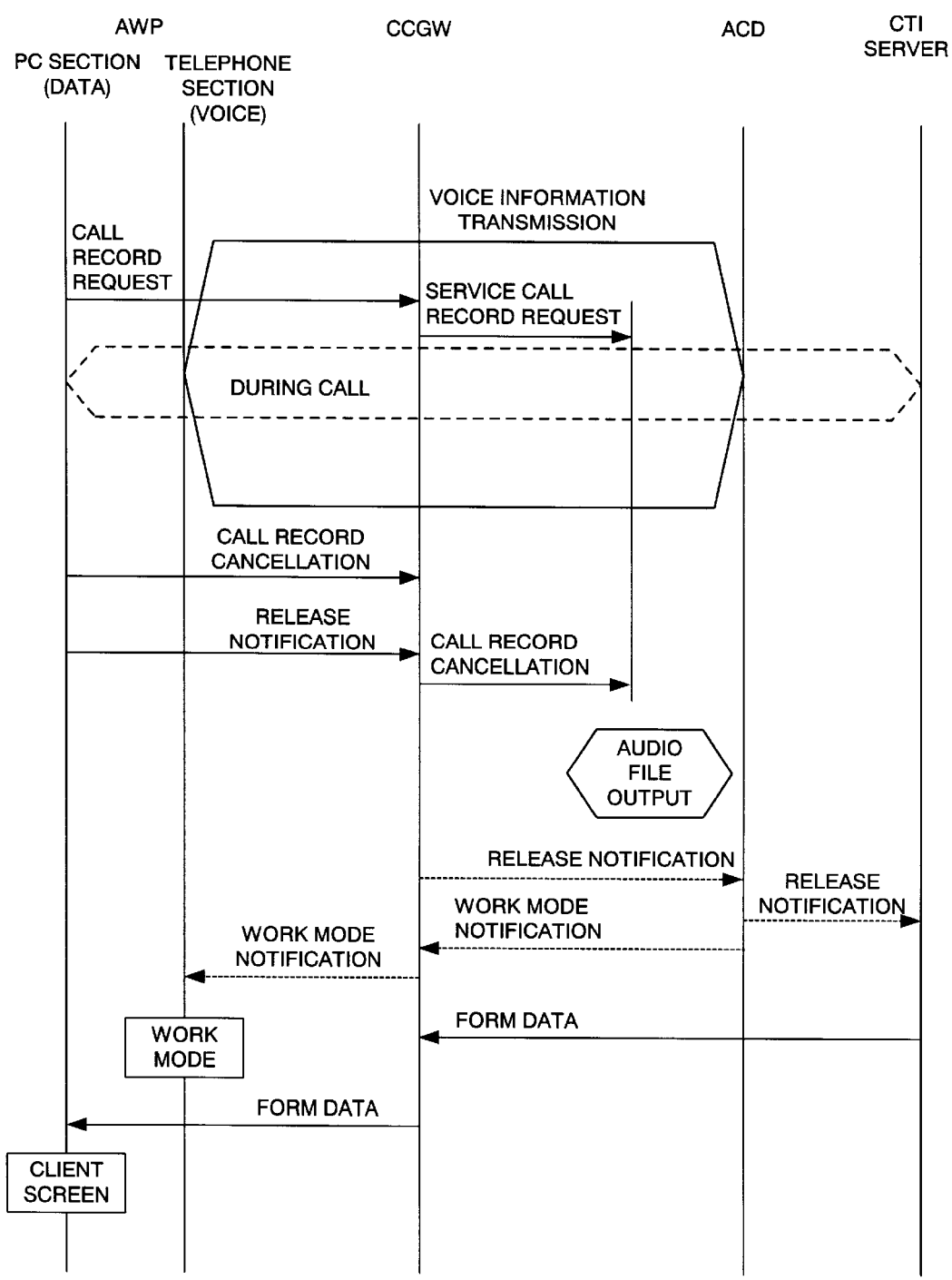
FIG. 13 is a sequence chart showing call record processing of the CCGW in FIG. 1 by means of intention of an operator.

Next, a call record of the home agent clients 90 will be explained. FIG. 13 is a sequence chart showing call record processing of the CCGW in FIG. 1 by means of intention of an operator. With regard to the call record of the home agent clients 90, like a method of conducting a call record by means of intention of an in-home operator or an operator in a remote office, which is shown in FIG. 13, condition of the home agent clients 90 moves to "during calls", and by means of the operation of the agent client screen, a call record request is issued to the CCGW 50.

The CCGW 50 applies media conversion to voice information, which was converted into an IP packet by executing the call record request in a call record process inside the CCGW 50, to create a digital audio file form such as a WAV, and realizes a call record.

The call record is continuously accumulated until call record cancellation notification or release notification of a call during call is sent to the CCGW 50 from the home agent clients 90.

Figure 14:
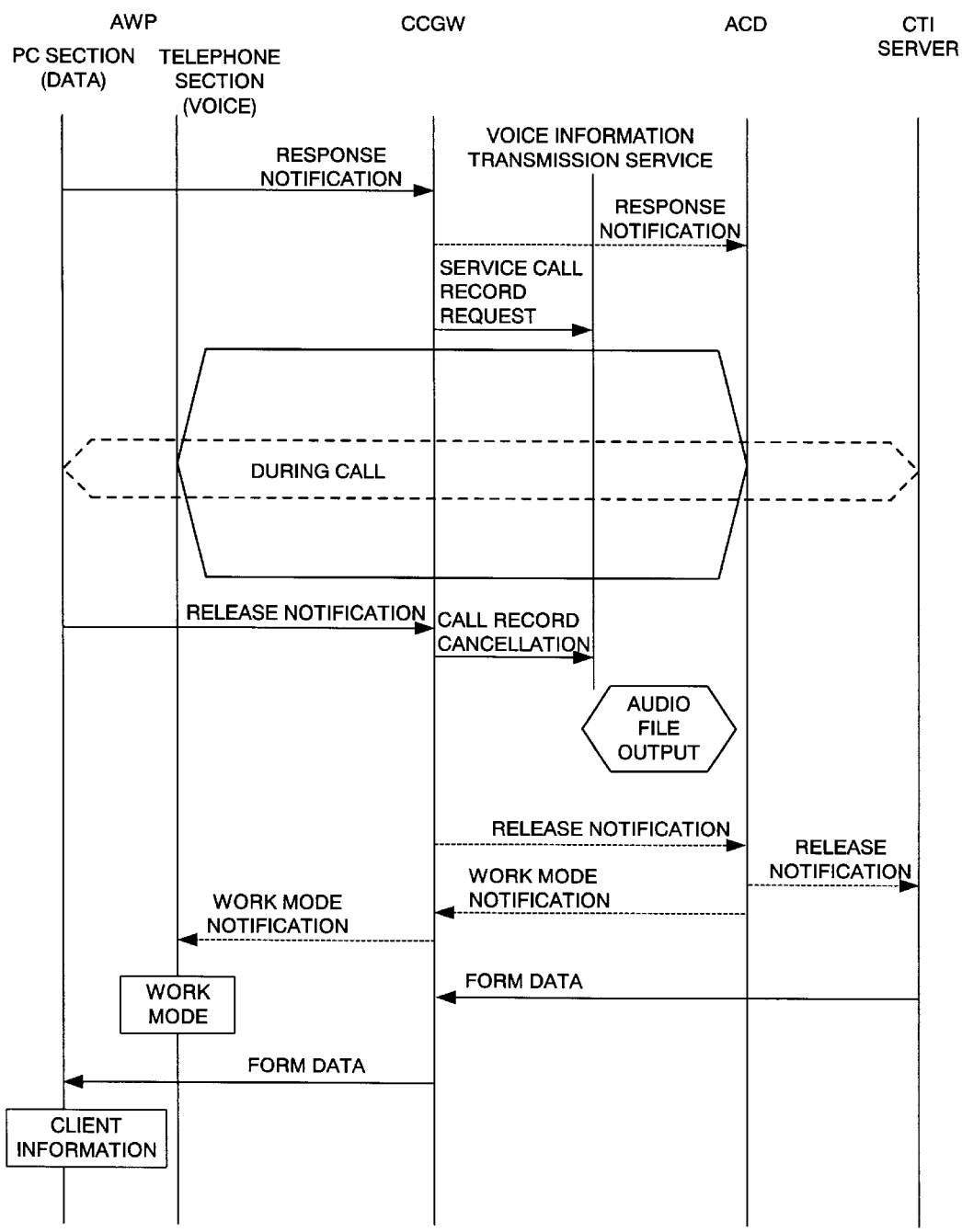
FIG. 14 is a sequence chart showing automatic call record processing of the CCGW in FIG. 1.

FIG. 14 is a sequence chart showing automatic call record processing of the CCGW in FIG. 1.

Otherwise, like a method in which a system automatically conducts a call record for every call of the home agent clients 90, which is shown in FIG. 14, by receiving response notification in which the CCGW 50 is notified of condition transition of the home agent clients 90 in the response of a call, the. CCGW 50 executes a call record request in a call record process inside of the CCGW 50, and the call record operates until release notification of a call from the home agent clients 90 is sent to the CCGW 50.

Finally, the drawings showing the operation of voice communication of the CCGW 50 will be explained.

FIG. 5 shows that a call that arrived at the ACD system 10 conducts communication with the AWP 91, and that voice information converted into an IP packet retrieves an IP address of the corresponding AWP 91 in the ADB 505, and applies address conversion thereto, and transmits it to the internet 2.

FIG. 6 shows that, in the voice information transmission process inside the CCGW 50, media conversion is applied to information stored in an apparatus connected to the LAN 81 as the voice information DB 506, and the information is converted into an IP packet, and is transmitted to the corresponding AWP 91.

FIG. 7 shows that, in the call record process inside the CCGW 50, during call between a call that arrived at the ACD system 10 and the AWP 91, media conversion is applied to voice information converted into an IP packet, and forming of a digital audio file such as WAV is conducted, and it is accumulated in an apparatus connected to the LAN 81 as the voice information DB 506.

As explained above, if an operator such as an in-home operator and an operator in a remote office uses the home agent clients 90, it is impossible to conduct reception processing same as that in case of using the call center agent clients 30 of the call center.

Moreover, since, when a reception request call from the telephone set 5 is received, the home agent clients 90 capable of receiving the call are allocated by means of the ACD system 10, the call can be quickly connected to an operator (such as an in-home operator and an operator in a remote center) of a call center far from a call center.

Further, since IP packet communication can be conducted between the call center and the home agent clients, communication of voice and a data can be concurrently handled.

Furthermore, the present invention effects an advantage that, by conducting internet access by way of the ISP using an analog subscription circuit or an ISDN circuit, an in-home operator or a call center operator in a remote office can use a function same as the call center agent clients capable of concurrently handling communication of voice and a data. Further, as a result, the present invention effects an advantage that serious tasks of maintenance of resources of a brilliant operator in a call center system that continues to enlarge its scale, and maintenance of an area of a call center can be solved.

Also, the present invention effects an advantage that, since the call link between the call center and the home agent clients is maintained, connection processing of a call that arrived at the call center can be quickly processed.

The entire disclosure of Japanese Patent Application No. 11-261118 filed on Sep. 14, 1999 including specification, claims, drawing and summary are incorporated herein by reference in its entirety.

What is claimed is:

1. A system for realizing a home agent client function for a call center system, having a public network, an internet, a call center connected to said public network and said internet, and a telephone set of a client of said call center connected to said public network, wherein said call center has a telephone exchange system having an ACD function, a server for cooperating with said telephone exchange system by means of a computer telephony interface, and a call center agent client having an exclusive telephone function of said telephone exchange system, which operates as a client of said server and conducts telephone reception processing, wherein said system for realizing a home agent client function comprises a home agent client for remotely conducting reception processing of said call center by way of said internet through an internet service provider for connecting said public network to said internet, said call center has:

connection means for connecting said telephone set to said home agent client through said telephone exchange system based on a reception request call to said call center from said telephone set; and conversion means for applying two-way data conversion to voice information and control information in association with said voice information to generate an internet protocol packet, and said home agent client has emulation means for emulating said exclusive telephone function of said telephone exchange system, which operates on a web browser.

2. A system for realizing a home agent client function for a call center system according to claim 1, wherein said home agent client handles both voice and a data by having access to said internet by way of said internet service provider using one circuit of said public network.

3. A system for realizing a home agent client function for a call center system according to claim 1, wherein said home agent client has:

registration procedure means for applying log-in processing of said call center agent client to said server by way of said internet; and holding means for continuing to hold a call link established until log-out processing of said call center agent client is applied to said server.

4. A system for realizing a home agent client function for a call center system according to claim 2, wherein said home agent client has:

registration procedure means for applying log-in processing of said call center agent client to said server by way of said internet; and holding means for continuing to hold a call link established until log-out processing of said call center agent client is applied to said server.

5. A system for realizing a home agent client function for a call center system according to claim 1, wherein said call center system has delivery and notification means for conducting delivery and notification of miscellaneous information, such as communication items to an operator, information of goods and client related information, as voice information to said home agent client by way of said internet.

6. A system for realizing a home agent client function for a call center system according to claim 1, wherein said call center system has accumulation means for accumulating call contents of an operator by means of using said home agent client by way of said internet, said call contents stored in a digital audio file form as voice information.

7. A system for realizing a home agent client function for a call center system according to claim 5, wherein said call center system has accumulation means for accumulating call contents of an operator by means of using said home agent client by way of said internet, said call contents stored in a digital audio file form as voice information.

8. A system for realizing a home agent client function for a call center system according to claim 5, wherein said call center system continues to hold a call link for duration from log-in processing to log-out processing of said home agent client, and accepts said delivery and notification means if preset time passes when said home agent client moves to condition of waiting for reception of a call from said telephone exchange system.

9. A system for realizing a home agent client function for a call center system according to claim 6, wherein said call center system continues to hold a call link for duration from log-in processing to log-out processing of said home agent client, and accepts said accumulation means if preset time passes when said home agent client moves to condition of waiting for reception of a call from said telephone exchange system.

10. A system for realizing a home agent client function for a call center system according to claim 7, wherein said call center system continues to hold a call link for duration from log-in processing to log-out processing of said home agent client, and accepts said delivery and notification means and said accumulation means if preset time passes when said home agent client moves to condition of waiting for reception of a call from said telephone exchange system.

11. A method of realizing a home agent client function for a call center system, wherein a public network, an internet, a call center connected to said public network and said internet, and a telephone set of a client of said call center connected to said public network are provided, and wherein said call center has a telephone exchange system having an ACD function, a server for cooperating with said telephone exchange system by means of a computer telephony interface, and a call center agent client for operating as a client of said server and conducting telephone reception processing, wherein a home agent client is used, which remotely conducts reception processing of said call center by way of said internet through an internet service provider for connecting said public network to said internet, said home agent client is connected to said server by starting up a browser and establishes a call link with said telephone exchange system, and after establishment of said call link, establishes a condition of waiting for telephone reception processing by means of a screen input and notifies said call center of said condition of waiting for reception, and in case of receiving reception request call from said telephone set in said condition of waiting for reception, said call center connects said telephone set to said home agent client that is in said condition of waiting in reception, and makes said home agent client execute telephone reception processing from said telephone set, in case that connection to said telephone set is not connected under said condition of waiting for reception, said call center transmits voice information stored in said call center with an internet protocol packet, and wherein said home client has emulation means for emulating an exclusive telephone function of said telephone exchange system, which operates on a web browser.

12. A method of realizing a home agent client function for a call center system according to claim 11, wherein said home agent client handles both voice and a data by having access to said internet by way of said internet service provider using one circuit of said public network.

13. A method of realizing a home agent client function for a call center system according to claim 11, wherein said home agent client handles both voice and a data by having access to said internet by way of said internet service provider using one circuit of said public network.

14. A method of realizing a home agent client function for a call center system according to claim 11, wherein said call center system has delivery and notification means for conducting delivery and notification of miscellaneous information, such as communication items to an operator, information of goods and client related information, as voice information to said home agent client by way of said internet.

15. A method of realizing a home agent client function for a call center system according to claim 11, wherein said call center system has delivery and notification means for conducting delivery and notification of miscellaneous information, such as communication items to an operator, information of goods and client related information, as voice information to said home agent client by way of said internet.

16. A method of realizing a home agent client function for a call center system according to claim 11, wherein said call center system has accumulation means for accumulating call contents of an operator by means of using said home agent client by way of said internet, said contents stored in a digital audio file form as voice information.

17. A method of realizing a home agent client function for a call center system according to claim 11, wherein said call center system has accumulation means for accumulating call contents of an operator by means of using said home agent client by way of said internet, said contents stored in a digital audio file form as voice information.

18. A method of realizing a home agent client function for a call center system according to claim 14, wherein said call center system has accumulation means for accumulating call contents of an operator by means of using said home agent client by way of said internet, said contents stored in a digital audio file form as voice information.

19. A method of realizing a home agent client function for a call center system according to claim 18, wherein said call center system continues to hold a call link for duration from log-in processing to log-out processing of said home agent client, and accepts said delivery and notification means and said accumulation means if preset time passes when said home agent client moves to condition of waiting for reception of a call from said telephone exchange system.

* * * * *